(12) United States Patent
Gudapati et al.

(10) Patent No.: US 11,358,589 B1
(45) Date of Patent: Jun. 14, 2022

(54) ENGINE CONTROL MODULE PARK LOCK SOLENOID CONTROL FOR HYBRID TRANSMISSION

(71) Applicants: Abhilash Gudapati, Troy, MI (US); Jayant Chalke, Auburn Hills, MI (US); Ankur Jaiswal, Auburn Hills, MI (US)

(72) Inventors: Abhilash Gudapati, Troy, MI (US); Jayant Chalke, Auburn Hills, MI (US); Ankur Jaiswal, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/159,892

(22) Filed: Jan. 27, 2021

(51) Int. Cl.
*B60W 20/50* (2016.01)
*B60T 1/00* (2006.01)
(Continued)

(52) U.S. Cl.
CPC ............. *B60W 20/50* (2013.01); *B60T 1/005* (2013.01); *B60W 10/06* (2013.01); *B60W 10/08* (2013.01); *B60W 10/10* (2013.01); *B60W 10/182* (2013.01); *B60W 30/18009* (2013.01); *B60W 2510/0666* (2013.01); *B60W 2510/1035* (2013.01); *B60W 2540/00* (2013.01); *B60W 2540/16* (2013.01); *B60W 2710/06* (2013.01); *B60W 2710/08* (2013.01); *B60W 2710/1083* (2013.01); *B60W 2710/188* (2013.01); *B60Y 2200/92* (2013.01); *F16H 63/3475* (2013.01); *F16H 63/3483* (2013.01)

(58) Field of Classification Search
CPC ...... B60W 20/50; B60W 10/06; B60W 10/08; B60W 10/10; B60W 10/182; B60W 2510/0666; B60W 2510/1035; B60W 2710/06; B60W 2540/16; B60W 2710/08; B60W 2710/1083; B60W 2710/188; F16H 63/3475; F16H 63/3483; B60T 13/588; B60T 17/221
USPC ................................................. 701/62; 477/4
See application file for complete search history.

(56) References Cited

U.S. PATENT DOCUMENTS

| | | | |
|---|---|---|---|
| 7,270,027 B2 * | 9/2007 | Berger ................ | F16H 63/3433 74/335 |
| 7,374,511 B2 | 5/2008 | Berger et al. | |

(Continued)

FOREIGN PATENT DOCUMENTS

| | | | | |
|---|---|---|---|---|
| DE | 102009018122 A1 * | 10/2010 | ......... | F16H 63/3475 |
| DE | 102019124561 A1 * | 3/2021 | ......... | F16H 63/3483 |
| FR | 3088038 A1 * | 5/2020 | .......... | F16D 63/006 |

*Primary Examiner* — Roger L Pang
(74) *Attorney, Agent, or Firm* — Ralph E. Smith

(57) ABSTRACT

Non-inverted park lock systems and methods include an engine controller configured to control an engine of a vehicle in communication with a separate transmission controller via a controller area network (CAN), wherein the transmission controller is configured to control a transmission of the vehicle; and a conductor connecting the engine controller to a park lock solenoid disposed in the transmission and configured to move a park pawl to engage/disengage park. The engine controller keeps the park pawl disengaged from park during a power loss malfunction at the transmission controller and the transmission controller keeps the park pawl disengaged from park during a power loss malfunction at the engine controller by maintaining hydraulic pressure in the transmission at a threshold level until park is requested via the shifter.

16 Claims, 2 Drawing Sheets

(51) Int. Cl.
  *B60W 10/06*   (2006.01)
  *B60W 10/10*   (2012.01)
  *B60W 10/18*   (2012.01)
  *B60W 10/08*   (2006.01)
  *B60W 30/18*   (2012.01)
  *F16H 63/34*   (2006.01)

(56) References Cited

U.S. PATENT DOCUMENTS

| | | |
|---|---|---|
| 7,861,839 B2 | 1/2011 | Schweiher et al. |
| 2011/0281685 A1* | 11/2011 | Allgaier .............. B60W 30/188 477/4 |
| 2019/0032780 A1* | 1/2019 | Kinch ................ F16H 63/3483 |

\* cited by examiner

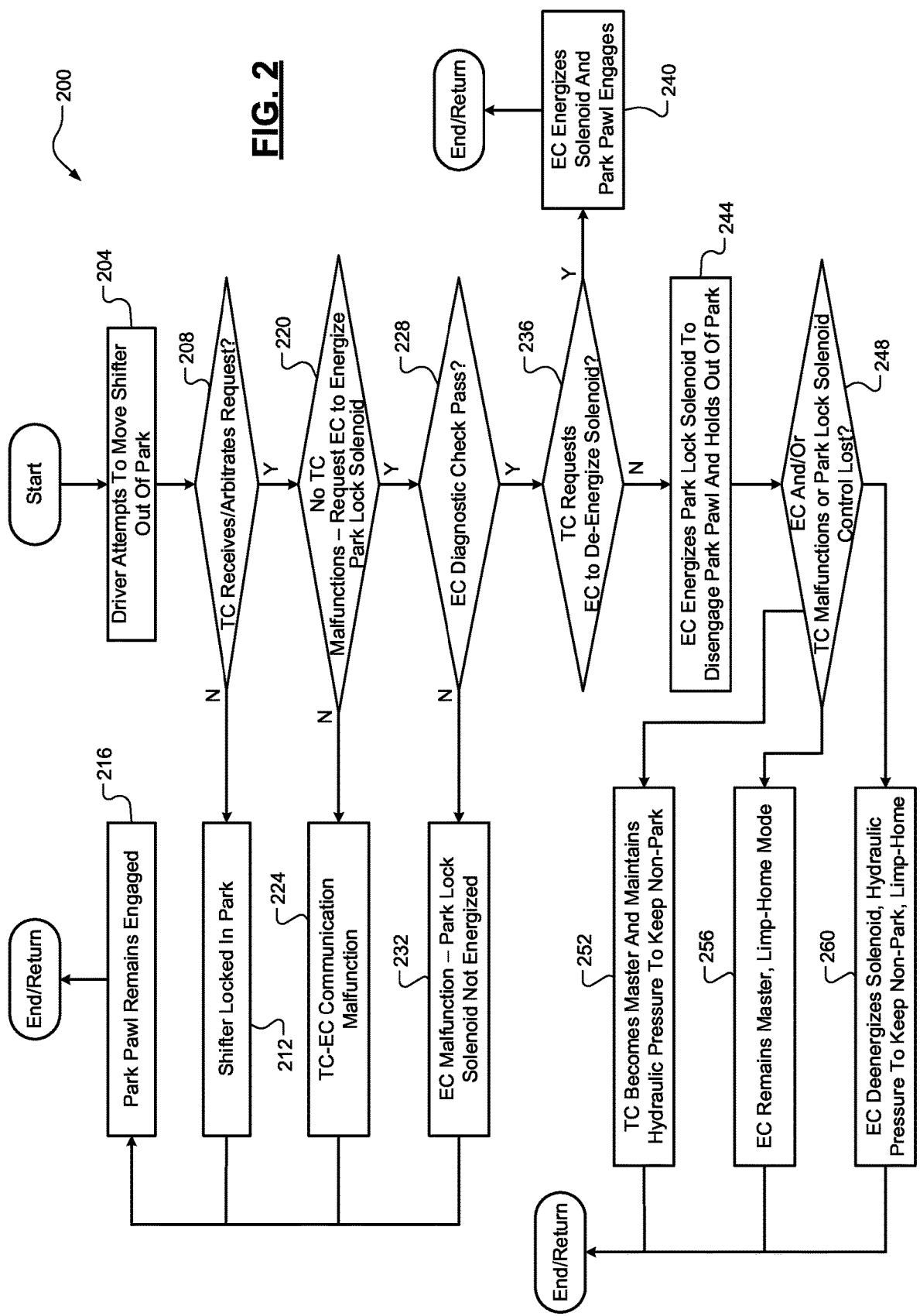

ENGINE CONTROL MODULE PARK LOCK SOLENOID CONTROL FOR HYBRID TRANSMISSION

FIELD

The present application generally relates to transmission park lock control and, more particularly, to systems and methods for engine control module park lock solenoid control for hybrid transmissions.

BACKGROUND

A park lock system includes a park pawl that typically engages a notched wheel on an output shaft of the transmission to lock-up the transmission in a park state. During potential malfunctions, such as transmission controller power loss, the park lock system could default to neutral (also known as an "inverted park lock system") or the park lock system could default to park (also known as a conventional or "non-inverted park lock system"). In an inverted park lock system, a transmission controller power loss would not maintain vehicle stability at speed as the park pawl could unintentionally drop at higher vehicle speeds. Also, the vehicle would not be secured once stopped and there would not be an ability to "auto-park," nor any limp-home capability. Non-inverted park lock systems also suffer from similar potential drawbacks that could potentially result in unintentional engagement of the park pawl. Conventional solutions include additional hardware, such as electric motor(s) and/or redundant power sources, but this increases system costs and complexity. Accordingly, while such transmission park lock systems do work for their intended purpose, there remains a desire for improvement in the relevant art.

SUMMARY

According to one example aspect of the invention, a non-inverted park lock system for a transmission of a vehicle is presented. In one exemplary implementation, the system comprises an engine controller configured to control an engine of the vehicle and in communication with a separate transmission controller via a controller area network (CAN), wherein the transmission controller is configured to control the transmission and a conductor connecting the engine controller to a park lock solenoid disposed in the transmission and configured to move a park pawl to engage/disengage park, wherein the engine controller is configured to keep the park pawl disengaged from park during a power loss malfunction at the transmission controller by supplying the park lock solenoid with energizing current via the conductor until park is requested via a shifter, and wherein the transmission controller is configured to keep the park pawl disengaged from park during a power loss malfunction at the engine controller by maintaining hydraulic pressure in the transmission at a threshold level until park is requested via the shifter.

In some implementations, the system does not include additional electric motors or power sources to control park lock during power loss malfunctions. In some implementations, the park pawl is kept disengaged from park while maintaining vehicle propulsion via a limp-home mode in a fixed gear of the transmission during a power loss malfunction at the transmission controller. In some implementations, the transmission is a hybrid transmission comprising at least one electric propulsion motor, and wherein the propulsion during the limp-home mode is provided by the at least one electric propulsion motor. In some implementations, the transmission controller is requested to maintain hydraulic pressure in the transmission at a threshold level until park is requested via the shifter using an electric auxiliary pump in the transmission in addition to hydraulic pressure generated by spinning of the at least one electric motor for propulsion.

In some implementations, the engine controller is configured to keep the park pawl disengaged from park during a power loss malfunction at the transmission controller by supplying the park lock solenoid with energizing current via the conductor to avoid unintentional engagement of the park pawl at high vehicle speeds due to insufficient support by an anti-lock braking system (ABS) on low coefficient of friction surfaces. In some implementations, the engine controller is configured to keep the park pawl disengaged from park during a power loss malfunction at the transmission controller by supplying the park lock solenoid with energizing current via the conductor to avoid unintentional engagement of the park pawl due to ratcheting of the park pawl when the vehicle comes to a stop. In some implementations, the transmission controller is configured to communicate with the engine controller via the CAN to energize/de-energize the park lock solenoid in response to input via the shifter.

According to another example aspect of the invention, a method of controlling a non-inverted park lock system for a transmission of a vehicle is presented. In one exemplary implementation, the method comprises providing an engine controller configured to control an engine of the vehicle and in communication with a separate transmission controller via a CAN, wherein the transmission controller is configured to control the transmission, providing a conductor connecting the engine controller to a park lock solenoid disposed in the transmission and configured to move a park pawl to engage/disengage park, maintaining, by the engine controller, the park pawl disengaged from park during a power loss malfunction at the transmission controller by supplying the park lock solenoid with energizing current via the until park is requested via a shifter, and maintaining, by the transmission controller, the park pawl disengaged from park during a power loss malfunction at the engine controller by maintaining hydraulic pressure in the transmission at a threshold level until park is requested via the shifter.

In some implementations, the non-inverted park lock system does not include additional electric motors or power sources to control park lock during power loss malfunctions. In some implementations, the park pawl is kept disengaged from park while maintaining vehicle propulsion via a limp-home mode in a fixed gear of the transmission during a power loss malfunction at the transmission controller. In some implementations, the transmission is a hybrid transmission comprising at least one electric propulsion motor, and wherein the propulsion during the limp-home mode is provided by the at least one electric propulsion motor. In some implementations, maintaining, by the transmission controller, hydraulic pressure in the transmission at a threshold level until park is requested via the shifter is performed in response to a request to the transmission controller and using an electric auxiliary pump in the transmission in addition to hydraulic pressure generated by spinning of the at least one electric motor for propulsion.

In some implementations, maintaining, by the engine controller, the park pawl disengaged from park during a power loss malfunction at the transmission controller by supplying the park lock solenoid with energizing current via the is to avoid unintentional engagement of the park pawl at high vehicle speeds due to insufficient support by an ABS on low coefficient of friction surfaces. In some implementations, maintaining, by the engine controller, the park pawl disengaged from park during a power loss malfunction at the transmission controller by supplying the park lock solenoid with energizing current via the is to avoid unintentional engagement of the park pawl due to ratcheting of the park pawl when the vehicle comes to a stop. In some implementations, the method further comprises communicating, by the transmission, with the engine controller via the CAN to energize/de-energize the park lock solenoid in response to input via the shifter.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

BRIEF DESCRIPTION OF THE DRAWINGS

FIG. 2 is a flow diagram of an example method of controlling a non-inverted park lock system for a transmission of a vehicle according to the principles of the present application.

DETAILED DESCRIPTION

Figure 1:
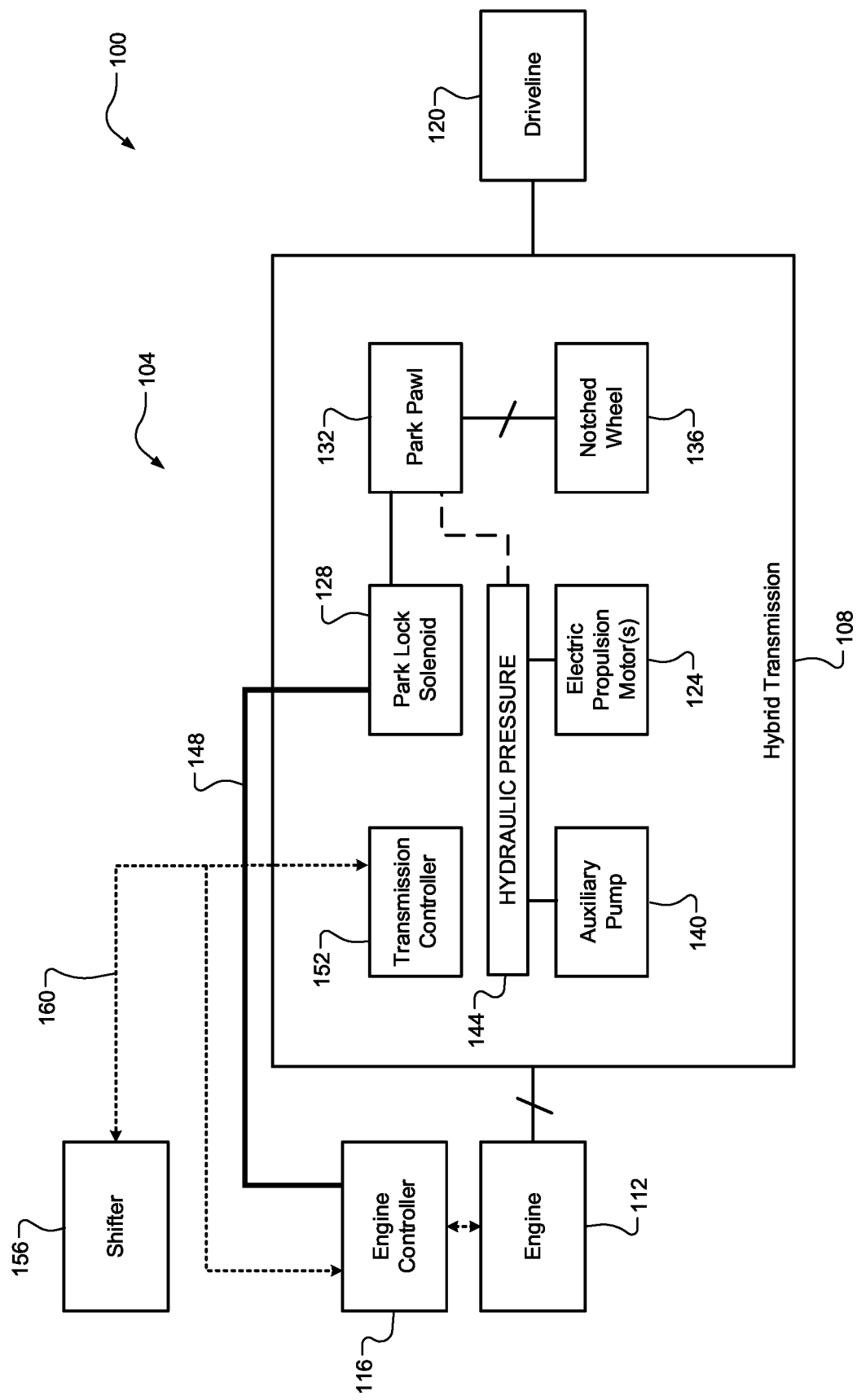
FIG. 1 is a functional block diagram of a vehicle having an example non-inverted park lock system for a transmission according to the principles of the present application.

As previously discussed, both inverted and conventional or non-inverted park lock systems could potentially suffer from problems due to transmission controller power loss. In a non-inverted park lock system, a transmission controller power loss could potentially unintentionally engage the park pawl (i) at high speeds due to insufficient support by an anti-lock braking system (ABS) on low coefficient of friction surfaces (e.g., either failure to activate or providing less braking force than required), (ii) after a gradual, sudden, or full vehicle power loss, even with electrical circuit changes to reduce single point failures, and (iii) at a vehicle stop when the park pawl could ratchet, which could also inhibit a limp-home mode.

Accordingly, improved non-inverted park lock systems and methods of control are presented. These systems and methods move the park lock solenoid control functionality from the transmission controller to an engine controller, which is also hardwired to the park lock solenoid. The engine controller and the transmission controller are in communication via a controller area network (CAN) such that the transmission controller is able to instruct the engine controller how to control the park pawl in response to input via a shifter. During a power loss malfunction at the engine controller, the transmission controller is able to keep the park pawl out of park via high hydraulic pressure generated by an auxiliary pump in the transmission in addition to hydraulic pressure generated by spinning of at least one electric motor in the transmission. Potential benefits of these systems and methods include the expected/desired functionality of a non-inverted park lock system without the addition of expensive/complex hardware (motor(s), redundant power source(s), etc.).

Referring now to FIG. 1, a functional block diagram of a vehicle 100 comprising a non-inverted park lock system 104 for a transmission 108 according to the principles of the present application is illustrated. The vehicle 100 further comprises an engine 112 controlled by an engine controller 116 and a driveline 120 to which drive torque is transferred by the transmission 108. The transmission 108 is a hybrid transmission comprising at least one electric propulsion motor 124 that is also configured to generate drive torque. The transmission 108 also comprises a park lock solenoid 128 that moves a park pawl 132 to engage/disengage a notched wheel 136 to lock-up/unlock the transmission 108 in/from a park state and an electric auxiliary pump 140 for controlling hydraulic pressure 144 in the transmission 108. The engine controller 116 is also hardwired to the park lock solenoid 128 via a conductor, such as wiring 148.

When the hydraulic pressure 144 is high (i.e., at or above a threshold level), the hydraulic pressure 144 can act on the park pawl 132 to keep it from engaging the notched wheel 136 and transitioning the transmission 108 to the park state. For example, such high levels of hydraulic pressure 144 could be maintained using the electric auxiliary pump 140 in addition to hydraulic pressure generated by spinning or rotation of the at least one electric propulsion motor 124. The transmission 108 further comprises a transmission controller 152 that controls the transmission 108 (e.g., based on input via a shifter 156) and is in communication with the engine controller 116 via a CAN 160. It will be appreciated that the vehicle 100 could further comprise other components, such as sensors/actuators, a driver interface, and an ABS system (not shown) configured to selectively apply (e.g., pulsate) friction brakes (not shown) at the driveline 120 to slow the vehicle 100.

Referring now to FIG. 2 and with continued reference to FIG. 1, a flow diagram of an example method 200 of controlling a non-inverted park lock system for a transmission of a vehicle according to the principles of the present application is illustrated. While the specific components of vehicle 100 are referenced, it will be appreciated that the method 200 could be applicable to any suitably configured non-inverted park lock system. At 204, the shifter 156 is moved out of park (e.g., by a driver of the vehicle 100. At 208, it is determined whether the transmission controller (TC) 152 has received and arbitrated the request. When true, the method 200 proceeds to 220. When false, it is determined at 212 that another malfunction has occurred.

More specifically, it is determined that the shifter 156 is locked in park. The park pawl then remains engaged at 216 and the method 200 ends. At 220, provided there are no transmission controller 152 malfunctions, it is determined whether the transmission controller 152 successfully transmitted a request via the CAN 160 for the engine controller (EC) 116 energize the park lock solenoid 128. When true, (i.e., no controller malfunctions and successful transmission), the method 200 proceeds to 228. When false (i.e., transmission controller malfunction or a transmission failure), it is determined at 224 that there is a communication malfunction between the transmission controller 152 and the engine controller 116 via the CAN 160 and the park pawl remains engaged at 216 and the method 200 ends. At 228, it is determined whether a diagnostic check run by the engine controller 116 passed. When true, the method 200 proceeds to 236. When false, it is determined at 232 that there the engine controller 116 is malfunctioning and thus the park lock solenoid 128 is not energized and the park pawl remains engaged at 216 and the method 200 ends.

At 236, the transmission controller 152 attempts to request the engine controller 116 to de-energize the park lock solenoid 128. When successful, the engine controller 116 de-energizes the park lock solenoid at 240 causing the park pawl 132 to engage and the method 200 ends. Otherwise, at 244, the engine controller 116 energizes the park lock solenoid 128 to disengage the park pawl 132 and the engine controller 116 continued to provide a steady or constant current to the park lock solenoid 128 via wiring 148 to keep the transmission 108 out of park. At 248, it is determined if/how the engine controller 116 reacts to internal and/or transmission controller 152 malfunctions. When the engine controller 116 malfunctions or park lock solenoid 128 control is lost, the method 200 proceeds to 252 where the transmission controller 152 becomes the master controller for park lock solenoid management and hydraulic pressure is maintained at a sufficiently high level to keep the park pawl 132 disengaged until park is requested via the shifter 156 and the method 200 ends.

When the transmission controller 152 malfunctions or communication malfunction(s) occur, the method 200 proceeds to 256 where the engine controller 116 becomes/remains the master controller and a limp-home mode is enabled (e.g., the transmission 108 shifts to a fixed/predetermined gear (e.g., low speeds) to maintain vehicle stability until park is requested via the shifter 156 and the method 200 ends. When both the transmission controller 152 and the engine controller 116 malfunction, the engine controller 116 de-energizes the park lock solenoid 128 and the limp-home mode is enabled at 260 as previously described and the method 200 ends.

It will be appreciated that the term "controller" as used herein refers to any suitable control device(s) that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A non-inverted park lock system for a transmission of a vehicle, the park lock system comprising:
   an engine controller configured to control an engine of the vehicle and in communication with a separate transmission controller via a controller area network (CAN), wherein the transmission controller is configured to control the transmission; and
   a conductor connecting the engine controller to a park lock solenoid disposed in the transmission and configured to move a park pawl to engage/disengage park,
   wherein the engine controller is configured to keep the park pawl disengaged from park during a power loss malfunction at the transmission controller by supplying the park lock solenoid with energizing current via the conductor until park is requested via a shifter, and
   wherein the transmission controller is configured to keep the park pawl disengaged from park during a power loss malfunction at the engine controller by maintaining hydraulic pressure in the transmission at a threshold level until park is requested via the shifter.

2. The system of claim 1, wherein the system is free from any additional non-motor power sources to control park lock during power loss malfunctions.

3. The system of claim 1, wherein the park pawl is kept disengaged from park while maintaining vehicle propulsion via a limp-home mode in a fixed gear of the transmission during a power loss malfunction at the transmission controller.

4. The system of claim 3, wherein the transmission is a hybrid transmission comprising at least one electric propulsion motor, and wherein the propulsion during the limp-home mode is provided by the at least one electric propulsion motor.

5. The system of claim 4, wherein the transmission controller is requested to maintain hydraulic pressure in the transmission at a threshold level until park is requested via the shifter using an electric auxiliary pump in the transmission in addition to hydraulic pressure generated by spinning of the at least one electric motor for propulsion.

6. The system of claim 1, wherein:
   a power loss malfunction at the transmission controller causes unintentional engagement of the park pawl at high vehicle speeds due to insufficient support by an anti-lock braking system (ABS) on low coefficient of friction surfaces; and
   during the power loss malfunction at the transmission controller, the engine controller is configured to supply the park lock solenoid with energizing current via the conductor to avoid the unintentional engagement of the park pawl.

7. The system of claim 1, wherein:
   a power loss malfunction at the transmission controller causes unintentional engagement of the park pawl due to ratcheting of the park pawl when the vehicle comes to a stop; and
   during the power loss malfunction at the transmission controller, the engine controller is configured to supply the park lock solenoid with energizing current via the conductor to avoid the unintentional engagement of the park pawl.

8. The system of claim 1, wherein the transmission controller is configured to communicate with the engine controller via the CAN to energize/de-energize the park lock solenoid in response to input via the shifter.

9. A method of controlling a non-inverted park lock system for a transmission of a vehicle, the method comprising:
   providing an engine controller configured to control an engine of the vehicle and in communication with a separate transmission controller via a controller area network (CAN), wherein the transmission controller is configured to control the transmission;
   providing a conductor connecting the engine controller to a park lock solenoid disposed in the transmission and configured to move a park pawl to engage/disengage park;
   maintaining, by the engine controller, the park pawl disengaged from park during a power loss malfunction at the transmission controller by supplying the park lock solenoid with energizing current via the conductor until park is requested via a shifter; and maintaining, by the transmission controller, the park pawl disengaged from park during a power loss malfunction at the engine controller by maintaining hydraulic pressure in the transmission at a threshold level until park is requested via the shifter.

10. The method of claim 9, wherein the non-inverted park lock system is free from any non-motor power sources to control park lock during power loss malfunctions.

11. The method of claim 9, wherein the park pawl is kept disengaged from park while maintaining vehicle propulsion via a limp-home mode in a fixed gear of the transmission during a power loss malfunction at the transmission controller.

12. The method of claim 11, wherein the transmission is a hybrid transmission comprising at least one electric propulsion motor, and wherein the propulsion during the limp-home mode is provided by the at least one electric propulsion motor.

13. The method of claim 12, wherein maintaining, by the transmission controller, hydraulic pressure in the transmission at a threshold level until park is requested via the shifter is performed in response to a request to the transmission controller and using an electric auxiliary pump in the transmission in addition to hydraulic pressure generated by spinning of the at least one electric motor for propulsion.

14. The method of claim 9, wherein:

a power loss malfunction at the transmission controller causes unintentional engagement of the park pawl at high vehicle speeds due to insufficient support by an anti-lock braking system (ABS) on low coefficient of friction surfaces; and during the power loss malfunction at the transmission controller, the engine controller is configured to supply the park lock solenoid with energizing current via the conductor to avoid the unintentional engagement of the park pawl.

15. The method of claim 9, wherein:

a power loss malfunction at the transmission controller causes unintentional engagement of the park pawl due to ratcheting of the park pawl when the vehicle comes to a stop; and during the power loss malfunction at the transmission controller, the engine controller is configured to supply the park lock solenoid with energizing current via the conductor to avoid the unintentional engagement of the park pawl.

16. The method of claim 9, further comprising communicating, by the transmission, with the engine controller via the CAN to energize/de-energize the park lock solenoid in response to input via the shifter.

* * * * *